(12) United States Patent
Scalzo et al.

(10) Patent No.: US 9,970,318 B2
(45) Date of Patent: May 15, 2018

(54) SHROUD SEGMENT AND METHOD OF MANUFACTURING

(71) Applicant: Pratt & Whitney Canada Corp., Longueuil (CA)

(72) Inventors: Orlando Scalzo, Montreal (CA); Marc Campomanes, Longueuil (CA); Eric Hosking, Longueuil (CA); Alain Bouthillier, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 915 days.

(21) Appl. No.: 14/314,233

(22) Filed: Jun. 25, 2014

(65) Prior Publication Data

US 2015/0377063 A1 Dec. 31, 2015

(51) Int. Cl.
*F01D 25/12* (2006.01)
*B22F 5/00* (2006.01)
(Continued)

(52) U.S. Cl.
CPC .............. *F01D 25/12* (2013.01); *B22F 3/225* (2013.01); *B22F 5/009* (2013.01); *B22F 5/10* (2013.01); *B22F 7/062* (2013.01); *B23K 26/08* (2013.01); *B23K 26/244* (2015.10); *B23K 26/32* (2013.01); *B23K 26/324* (2013.01); *B23K 35/0244* (2013.01); *B23K 35/0255* (2013.01); *B22F 2998/10* (2013.01); *B22F 2999/00* (2013.01); *B23K 2201/001* (2013.01); *B23K 2203/00* (2013.01); *B23K 2203/08* (2013.01); *B23K 2203/52* (2015.10); *F05D 2230/21* (2013.01); *F05D 2230/22* (2013.01); *F05D 2230/23* (2013.01); *F05D 2230/234* (2013.01)

(58) Field of Classification Search
CPC .................................. B22F 7/06; F01D 25/12
See application file for complete search history.

(56) References Cited

U.S. PATENT DOCUMENTS 3,351,688 A 11/1967 Kingery et al.
4,236,923 A 12/1980 Takahashi et al.
(Continued)

FOREIGN PATENT DOCUMENTS

DE 102004057360 6/2006
EP 1296370 3/2003
(Continued)

*Primary Examiner* — Christopher Kessler
(74) *Attorney, Agent, or Firm* — Norton Rose Fulbright Canada (57) ABSTRACT

A method of manufacturing a shroud segment, including separately molding at least first and second parts by powder injection molding. The first part has an inner surface and at least one fluid passage in communication with the inner surface. The second part has an outer surface complementary to the inner surface of the first part. At least one of the inner and outer surfaces is formed to define a plurality of grooves. A plurality of cooling passages in fluid communication with the at least one fluid passage are defined with the plurality of grooves by interconnecting the inner and outer surfaces while the first and second parts remain in a green state. The interconnected parts are debound and sintered to fuse the parts to define at least a portion of the shroud segment including the cooling passages.

20 Claims, 5 Drawing Sheets

(51) Int. Cl.
*B23K 26/08* (2014.01)
*B23K 26/32* (2014.01)
*B23K 26/324* (2014.01)
*B23K 26/244* (2014.01)
*B22F 3/22* (2006.01)
*B22F 5/10* (2006.01)
*B22F 7/06* (2006.01)
*B23K 35/02* (2006.01)
*B23K 101/00* (2006.01)
*B23K 103/00* (2006.01)
*B23K 103/08* (2006.01)

(56) References Cited

U.S. PATENT DOCUMENTS

| | | |
|---|---|---|
| 4,503,009 A | 3/1985 | Asaka |
| 4,839,138 A | 6/1989 | Filz |
| 5,043,123 A | 8/1991 | Gormanns et al. |
| 5,078,929 A | 1/1992 | Matsumae et al. |
| 5,271,877 A | 12/1993 | Matsumae et al. |
| 5,554,338 A | 9/1996 | Sugihara et al. |
| 5,574,957 A | 11/1996 | Barnard et al. |
| 5,732,323 A | 3/1998 | Nyrhilä |
| 5,933,733 A | 8/1999 | Ferla et al. |
| 6,033,788 A | 3/2000 | Cawley et al. |
| 6,114,048 A | 9/2000 | Jech et al. |
| 6,120,727 A | 9/2000 | Asaka et al. |
| 6,228,508 B1 | 5/2001 | Kassanits et al. |
| 6,322,746 B1 | 11/2001 | LaSalle et al. |
| 6,514,627 B1 | 2/2003 | Heil et al. |
| 6,569,380 B2 | 5/2003 | Lim et al. |
| 6,599,465 B1 | 7/2003 | Reppel et al. |
| 6,676,892 B2 | 1/2004 | Das et al. |
| 6,889,419 B2 | 5/2005 | Reiter, Jr. et al. |
| 6,973,723 B2 | 12/2005 | Cagney et al. |
| 7,146,708 B2 | 12/2006 | Reiter, Jr. et al. |
| 7,237,730 B2 | 7/2007 | Prociw et al. |
| 7,241,416 B2 | 7/2007 | Sweetland |
| 7,534,086 B2 | 5/2009 | Mazzola et al. |
| 7,721,436 B2 | 5/2010 | Prociw et al. |
| 7,726,936 B2 | 6/2010 | Keller et al. |
| 8,316,541 B2 | 11/2012 | Patel et al. |
| 8,596,963 B1 | 12/2013 | Liang |
| 2002/0028360 A1 | 3/2002 | Shaffer et al. |
| 2003/0202897 A1 | 10/2003 | Clark et al. |
| 2005/0019199 A1 | 1/2005 | Li et al. |
| 2008/0199343 A1 | 8/2008 | Rust et al. |
| 2009/0041607 A1* | 2/2009 | Meier ............... B22F 3/225 419/6 |
| 2009/0130459 A1 | 5/2009 | Kuenzler et al. |
| 2013/0052007 A1 | 2/2013 | Durocher et al. |
| 2015/0240721 A1* | 8/2015 | Campomanes ........... F02C 7/18 415/116 |

FOREIGN PATENT DOCUMENTS

| | | |
|---|---|---|
| GB | 2205541 | 9/1988 |
| GB | 2394724 | 5/2004 |
| GB | 2448031 | 10/2008 |
| JP | 03039405 | 2/1991 |
| WO | 0076697 | 12/2000 |
| WO | 2005030417 | 4/2005 |
| WO | 2007005632 | 1/2007 |
| WO | 2007098739 | 9/2007 |
| WO | 2008087064 | 7/2008 |

\* cited by examiner

SHROUD SEGMENT AND METHOD OF MANUFACTURING

TECHNICAL FIELD

The application relates generally to the manufacturing of shroud segments in gas turbine engines and, more particularly, to the manufacturing of shroud segments including cooling holes and passages.

BACKGROUND OF THE ART

Turbine shroud segments are typically designed with many cooling features, such as cooling holes and passages. Cooling holes and passages are usually created using electric discharge machining (EDM) operations after the shroud segment is formed. The use of EDM may increase the manufacturing costs and/or be limited by the accessibility of the process with respect to the geometry of the shroud segment.

SUMMARY

In one aspect, there is provided a method of manufacturing a shroud segment, the method comprising: separately molding at least first and second parts by powder injection molding, the first part being formed to define an arcuate outer portion of a platform of the shroud segment, the outer portion having an inner surface and at least one fluid passage extending through the outer portion and in communication with the inner surface, the second part being formed to define an arcuate inner portion of the platform, the inner portion having an outer surface complementary to the inner surface of the outer portion, at least one of the inner and outer surfaces being formed to define a plurality of grooves; defining a plurality of cooling passages with the plurality of grooves by interconnecting the inner and outer surfaces while the first and second parts remain in a green state, the plurality of cooling passages being in fluid communication with the at least one fluid passage of the outer portion; and debinding and sintering the interconnected parts to fuse the parts to define at least a portion of the shroud segment including the plurality of cooling passages.

In another aspect, there is provided a method of manufacturing a shroud segment, the method comprising: forming a first portion of a platform of the shroud segment in a green state through powder injection molding such that the first portion has a first arcuate surface, the first arcuate surface having a plurality of grooves defined therein; forming a second portion of the platform in a green state through powder injection molding such that the second portion has a second arcuate surface complementary to the first arcuate surface; interconnecting the first and second portions in the green state by interconnecting the first and second surfaces, wherein the grooves in the interconnected surfaces define a plurality of cooling passages, and wherein at least one of forming the first portion and forming the second portion includes defining at least one fluid passage in fluid communication with the plurality of cooling passages and with an outer surface of the platform; and debinding and sintering the interconnected portions to define the platform including the plurality of cooling passages in fluid communication with the outer surface of the platform.

DESCRIPTION OF THE DRAWINGS

Reference is now made to the accompanying figures in which.

DETAILED DESCRIPTION

Figure 1:
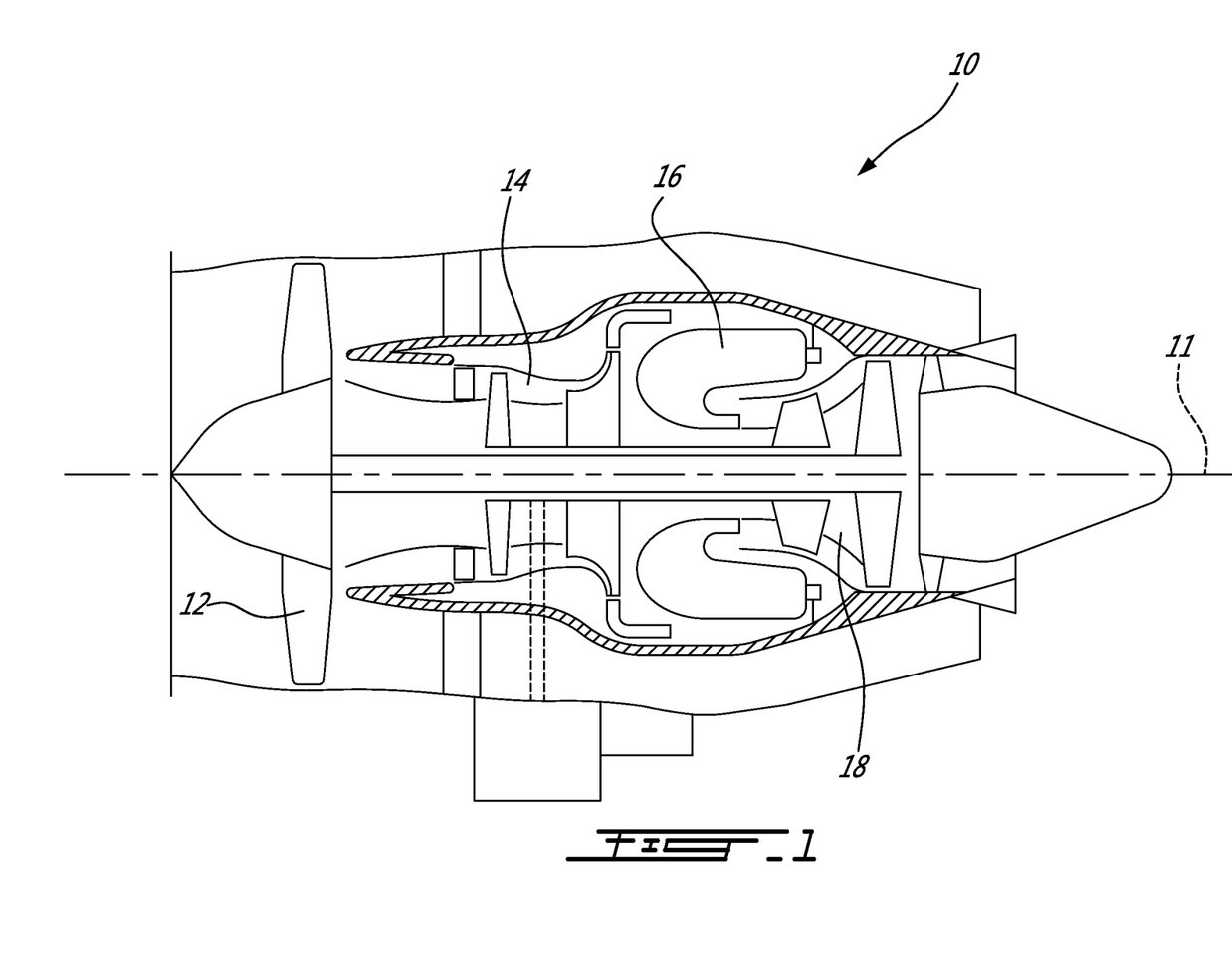
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the engine 10 is shown as a turbofan, it is understood that the engine 10 may have a different configuration, for example a turboshaft or turboprop configuration.

Figure 2:
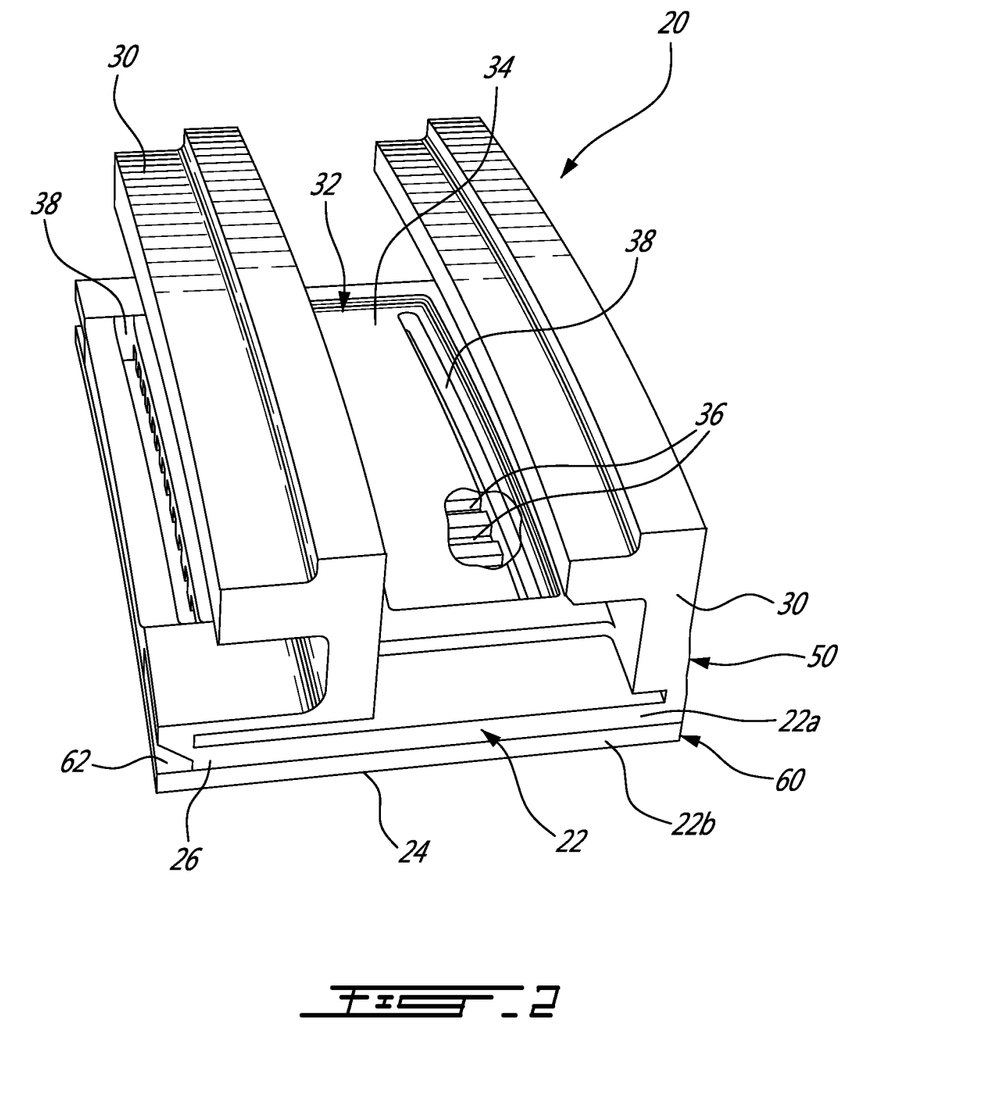
FIG. 2 is a schematic top tridimensional view of a shroud segment in accordance with a particular embodiment, which may be used in a gas turbine engine such as shown in FIG. 1, with a section broken away in order to show internal cooling passages.

Referring to FIG. 2, a shroud segment 20 is schematically shown, configured for example to form a circumferential portion of an annular shroud surrounding rotating blades of the turbine section 18 in a gas turbine engine 10 such as the one shown in FIG. 1. The body of the shroud segment 20 generally includes an arcuate platform 22 extending between two side surfaces 26 (only one of which being visible in FIG. 2) and defining an inner gaspath surface 24 coming into contact with the hot combustion gases travelling through the turbine section 18. The body of the shroud segment 20 also includes two axially spaced apart retention elements 30 extending radially outwardly from the platform 22 for engagement with an adjacent structure of the engine 10 to retain the shroud segment 20 in place. In the embodiment shown, the retention elements 30 are defined as hook structures having an L-shaped cross-section, but alternate shapes are also possible. Between the retention elements 30, the platform defines an outer surface 32 opposed to the gaspath surface 24.

In a particular embodiment, the shroud segment 20 is made of a nickel-based super alloy (e.g. MAR-M247®, Inconel® 625, any adequate type of nickel super alloy). Alternate materials are also possible.

In use, cooling air from an adjacent cavity of the engine in fluid communication with the compressor section 14 is directed on the outer surface 32. In the embodiment shown, the outer surface 32 defines a recess 34 in which the cooling air may circulate. The outer surface 32 may be directly exposed to the cooling air of the engine cavity, i.e. may define an exterior surface of the shroud segment 20. Alternately, the recess 34 may be covered by a plate (not shown) connected to the outer surface 32 around the recess 34 such that a plenum is defined between the plate and the recess 34. The plate is directly exposed to the cooling air of the engine cavity and has a plurality of cooling holes defined therethrough for circulating the cooling air into the plenum and on the outer surface 32.

The platform 22 is formed such as to allow circulation of the cooling air therethrough. The platform 22 includes a plurality of cooling passages 36 defined in proximity of the gaspath surface 24. In the embodiment shown, the cooling passages 36 are defined as a plurality of parallel passages, but alternate configurations are also possible, including, but not limited to, curved cooling passages, intersecting cooling passages, cooling passages having alternate interconnected ends to define a continuous zigzag pattern, etc. The platform 22 also includes at least one fluid passage 38 providing fluid communication between the outer surface 32 and the cooling passages 36. In the embodiment shown, two elongated fluid passages 38 are defined, each having a length extending along a circumferential direction of the shroud segment 20, and extending radially from the recessed portion 34 of the outer surface 32 to intersect and communicate with each of the cooling passages 36.

Figure 3:
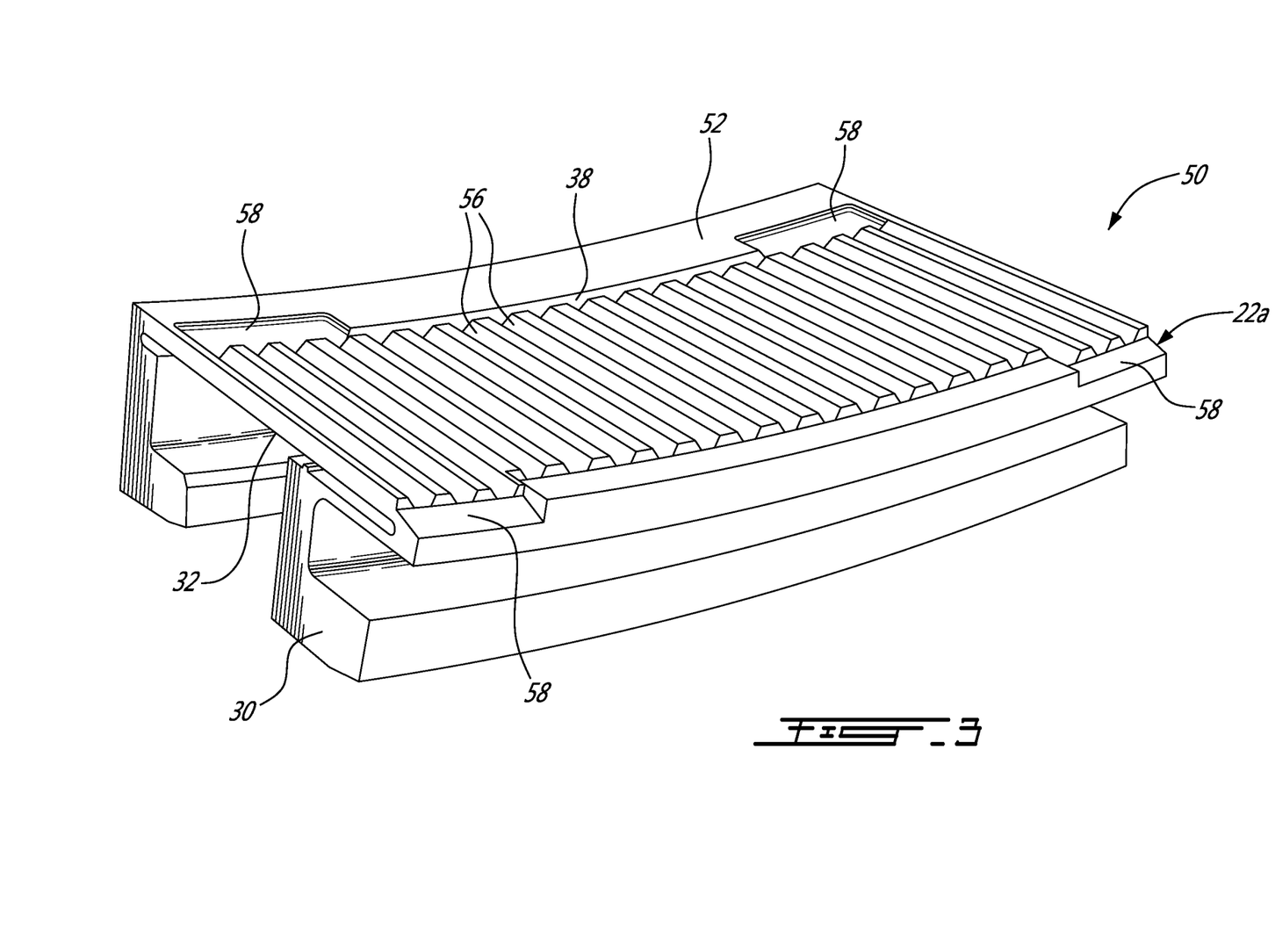
FIG. 3 is a schematic bottom tridimensional view of an outer part of the shroud segment of FIG. 2.

The platform 22 of the shroud segment 20 is manufactured from at least two separate parts, with the cooling passages 36 being defined at the intersection of the two parts. Referring to FIGS. 2-3, in a particular embodiment, the first part 50 includes at least an arcuate outer portion 22a of the platform 22. Referring particularly to FIG. 3, the outer platform portion 22a has an arcuate concave inner surface 52 which includes a plurality of grooves 56 defined therein, extending along an axial direction of the platform 22. Additional recessed portions 58 may be provided in the inner surface 52, for example at the ends of adjacent ones of the grooves 56 to define a fluid communication therebetween. The outer platform portion 22a also includes the outer surface 32 and the fluid passages 38 extending between the outer surface 32 and the grooves 56. In the embodiment shown, the entire shroud segment 20 is defined by two parts, and accordingly the first part 50 also includes the retention elements 30 extending from the outer platform portion 22a.

Referring back to FIG. 2, the second part 60 defines an arcuate inner portion 22b of the platform 22. The inner platform portion 22b has an arcuate convex outer surface 62 complementary to the inner surface 52 of the outer platform portion 22a, such that the cooperating inner and outer surfaces 52, 62 enclose the grooves 56 to define the cooling passages 36. In the embodiment shown, the second part 60 is an arcuate plate having a constant thickness, with the outer surface 62 having a smooth configuration, i.e. without grooves defined therein. In a particular embodiment, the thickness of the second part 60 is 0.040 inches or less. In a particular embodiment, a smaller thickness of the second part 60 allows for the cooling passages 36 to be defined closer to the gaspath surface 24 of the shroud segment 20, which may improve cooling of the gaspath surface 24 when exposed to the hot combustion gases of the turbine section 18.

Although the grooves 56 are being shown as defined in the inner surface 52 of the outer platform portion 22a, alternately, the grooves 56 may be defined in the outer surface 62 of the inner platform portion 22b with the inner surface 52 of the outer platform portion 22a having a smooth configuration; alternately, both the inner and outer surfaces 52, 62 may have complementary grooves which cooperate to define the cooling passages 36.

In a particular embodiment, manufacturing the shroud segment 20 includes separately molding the first and second parts 50, 60 by powder injection molding, each part 50, 60 being molded to create the respective portion 22a, 22b of the platform 22, configured for example as defined above. The parts 50, 60 are molded to define the complementary inner and outer surfaces 52, 62, and with the grooves 56 defined in at least one of the inner and outer surfaces 52, 62. In a particular embodiment, both parts 50, 60 are molded using the same feedstock and binder materials. Alternately, the two parts 50, 60 can be molded using different materials; for example, the first part 50 defining the outer platform portion 22a may be made from a feedstock of an appropriate type of a nickel-based super alloy (e.g. MAR-M247®, Inconel® 625, any adequate type of nickel super alloy), while the second part 60 defining the inner platform portion 22b may be made from a feedstock of an appropriate material to define a thermal barrier coating, such as for example an appropriate type of ceramic. Other suitable materials are also possible.

Thus, each part 50, 60 is created in its green state by injection molding of a feedstock, which is a homogeneous mixture of an injection powder (metal, ceramic, glass, carbide) with a binder. In a particular embodiment, the metal, ceramic and/or carbide powder is mixed with the molten binder and the suspension of injection powder and binder is injected into a mold and cooled to a temperature below that of the melting point of the binder. Alternately, the feedstock is in particulate form and is injected into a heated mold where the binder melts, and the mold is then cooled until the binder solidifies. In a particular embodiment, the binder is an organic material which is molten above room temperature (20° C.) but solid or substantially solid at room temperature. The binder may include various components such as lubricants and/or surfactants, and may include a mixture of a lower and a higher melting temperature polymer or polymers. "Green state" or "green part" as discussed herein thus refers to a molded part produced by the solidified binder that holds the injection powder together.

After the parts 50, 60 are molded and while they are still in their green state, the cooling passages 36 are defined by interconnecting the complementary inner and outer surfaces 52, 62 to enclose the grooves 56. The green parts 50, 60 may be connected using non-detachable connections (i.e. which may not be detached without causing damage to the parts) or detachable connections (i.e. which may be detached without causing damage to the parts). Examples of connections between the inner and outer surfaces 52, 62 may include threaded engagement, dovetail joints, mechanical connectors made of feedstock or filler feedstock including but not limited to bolts, clips, clamps, couplings, lugs, pins and rivets, addition of a small amount of molten feedstock to the junction between the parts, through heating one or more of the parts 50, 60 near the contacting portions of the surfaces 52, 62 to locally melt the binder, through heating one or more of the parts 50, 60 at the contacting portions of the surfaces 52, 62 to locally soften the binder without melting it, by using a melted filler feedstock as a glue between the contacting portions of the surfaces 52, 62, etc. The filler feedstock may have a different binder than that used in the green parts 50, 60 such as to have a lower melting point to be liquid or paste-like at a temperature where the green parts 50, 60 remain solid.

Figure 4:
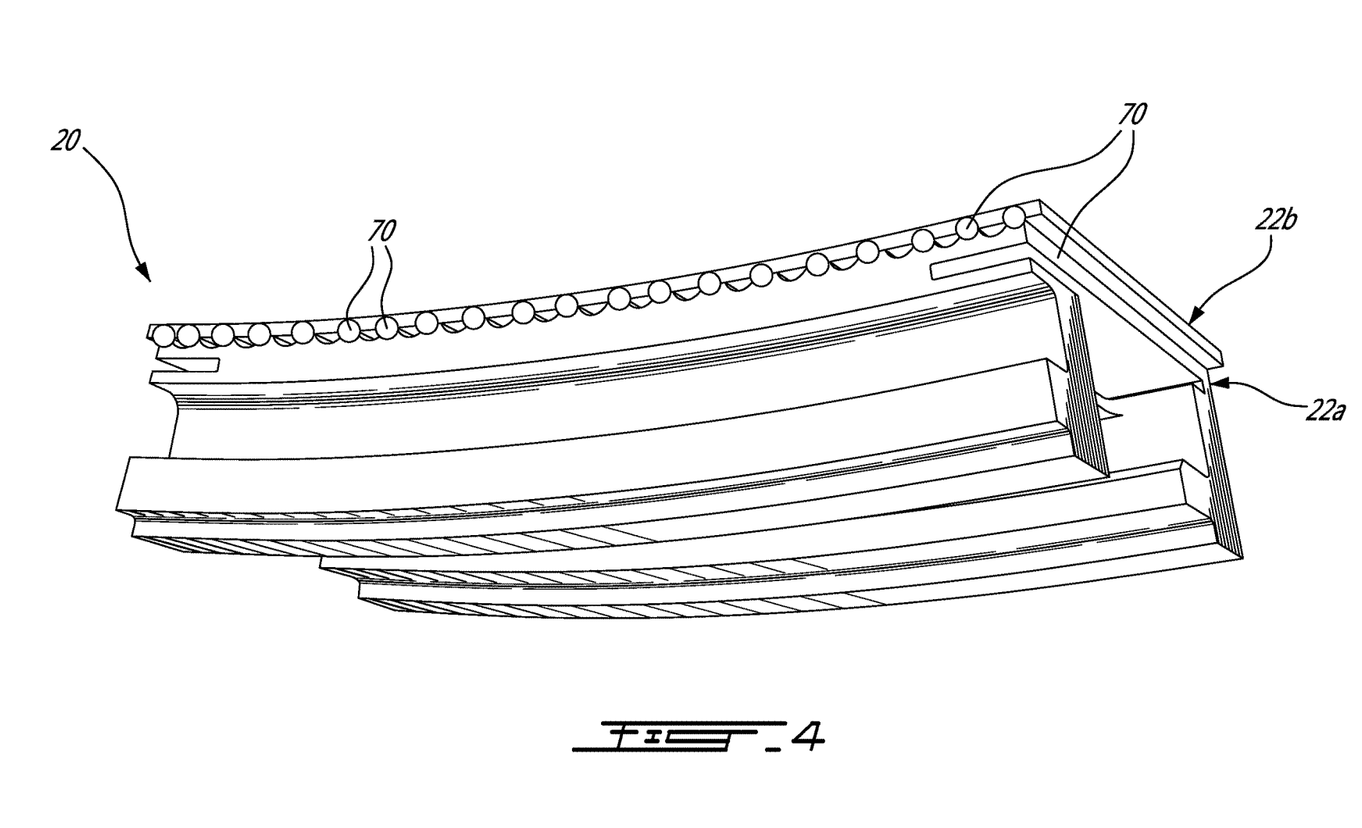
FIG. 4 is a schematic cross-sectional tridimensional view of the shroud segment of FIG. 2.

In a particular embodiment, the inner and outer surfaces 52, 62 are non-detachably interconnected by heating the contacting portions 70 of the inner and outer surfaces 52, 62 at a temperature higher than the melting temperature of the binder in the green parts and lower than the boiling temperature of the binder. In a particular embodiment, the inner and outer surfaces 52, 62 contact one another along each non-recessed and non-grooved section of one surface which is aligned with a non-recessed and non-grooved section of the other. In a particular embodiment and as shown in FIG. 4, the contacting portions 70 are defined along the perimeter of the surfaces 52, 62, as well as between each adjacent ones of the grooves 56, and each of these contacting portions 70 are interconnected at least along a part thereof, for example through heating.

Figure 5:
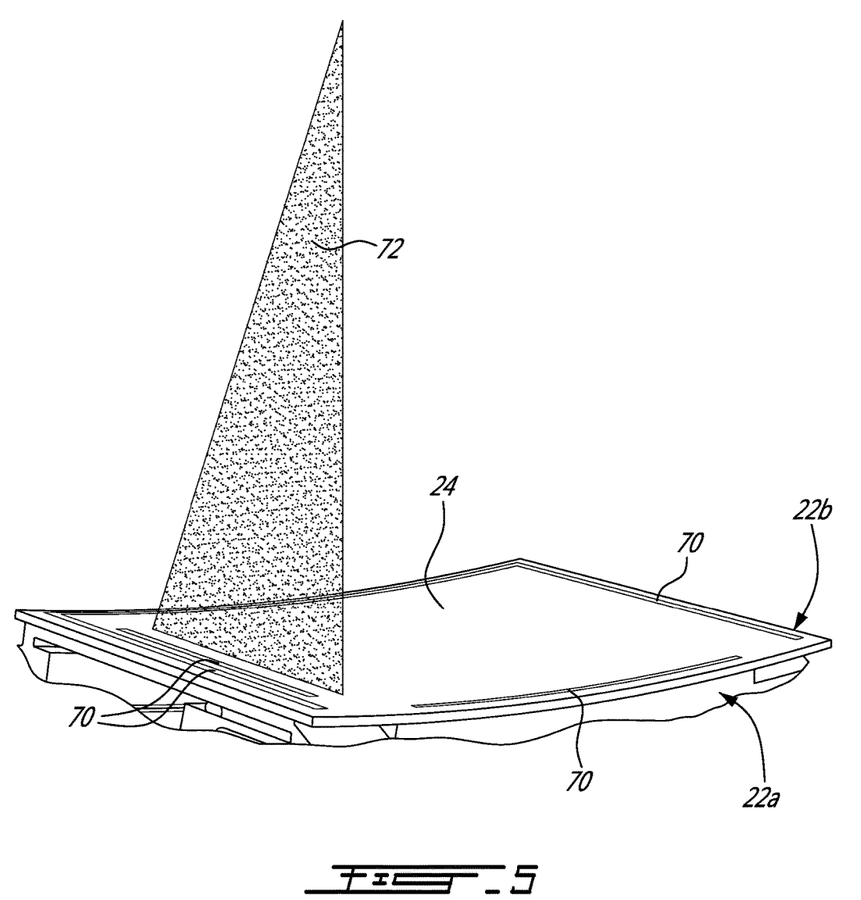
FIG. 5 is a schematic partial tridimensional view of the shroud segment of FIG. 2, showing a manufacturing step in accordance with a particular embodiment.

In a particular embodiment and as shown in FIG. 5, the contacting portions 70 of the inner and outer surfaces 52, 62 are interconnected by heating using a laser beam 72 directed on the surface of the inner platform portion 22b opposed from the outer platform portion 22a, i.e. the exterior surface defining the gaspath surface 24 of the shroud segment 20. The heat from the laser beam 72 thus melts the binder through the inner platform portion 22b to weld the contacting portions 70 of the inner and outer surfaces 52, 62. In a particular embodiment, the gaspath surface 24 is cooled during application of the laser beam 72 through the inner platform portion 22b, for example by directing cooling air thereon using one or more fans and/or by circulating cooling air through the cooling passages 36 created by the assembly.

In a particular embodiment, the laser beam 72 is a fanned laser beam which is directed using a numerically controlled machine tool programmed with the geometry of the shroud segment 20 to ensure that the laser beam 72 is directed only on contacting portions 70 of the inner and outer surfaces 52, 62 and not, for example, in one of the grooves 56. In a particular embodiment, directing the laser beam only on the contacting portions 70 may avoid or limit deformations in the parts 50, 60 during application of the laser beam. In a particular embodiment, the laser parameters e.g. power, frequency, spot size, feed rate, and optionally the amount of cooling air being circulated on the gaspath surface 24 and/or in the cooling passages 36 during the application of the laser beam are selected such as to melt both sides of the joint between the contacting portions 70 and create a seamless joint.

Once the parts 50, 60 are interconnected through the connection of the contacting inner and outer surfaces 52, 62, the interconnected parts 50, 60 are debound and sintered to fuse them together to form the shroud segment 20 with the cooling passages 36 defined therein. In a particular embodiment, the parts 50, 60 are fused during the debinding step when they are in the brown stage, i.e. prior to the sintering step.

"Brown stage" or "brown part" as discussed herein refers to a porous and friable part that is usually defined by an almost complete absence of binder. The brown part may be held together by some pre-sintering where a degree of pre-sintered injection powder particles are held together by a weak interaction of the particles between spaces formed at points where the binder was originally found, and/or may include a residual amount of binder that helps to hold the brown part together before final sintering. The removal of the binder is typically done by either heating or dissolution with a solvent. In cases where the debinding step is performed by heating the part, the temperature of the debinding step is typically lower than that of the sintering step.

In a particular embodiment, the shroud segment 20 is sintered with the gaspath surface 24 of the inner platform portion 22b resting against a complementary surface of a setter.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of manufacturing a shroud segment, the method comprising:
separately molding at least first and second parts by powder injection molding, the first part being formed to define an arcuate outer portion of a platform of the shroud segment, the outer portion having an inner surface and at least one fluid passage extending through the outer portion and in communication with the inner surface, the second part being formed to define an arcuate inner portion of the platform, the inner portion having an outer surface complementary to the inner surface of the outer portion, at least one of the inner and outer surfaces being formed to define a plurality of grooves;
defining a plurality of cooling passages with the plurality of grooves by interconnecting the inner and outer surfaces while the first and second parts remain in a green state, the plurality of cooling passages being in fluid communication with the at least one fluid passage of the outer portion; and
debinding and sintering the interconnected parts to fuse the parts to define at least a portion of the shroud segment including the plurality of cooling passages.

2. The method as defined in claim 1, wherein the parts are fused during the debinding and prior to the sintering.

3. The method as defined in claim 1, wherein the inner and outer surfaces are non-detachably connected.

4. The method as defined in claim 1, wherein the first and second parts together define an entirety of the shroud segment, the first part including at least one retention element extending radially outwardly from the outer portion of the platform.

5. The method as defined in claim 1, wherein interconnecting the inner and outer surfaces is performed by heating contacting portions of the inner and outer surfaces at a temperature higher than a melting temperature of a binder in the green parts and lower than a boiling temperature of the binder.

6. The method as defined in claim 5, wherein at least some of the contacting portions are defined between adjacent ones of the grooves.

7. The method as defined in claim 5, wherein the contacting portions are heated using a laser beam directed on an exterior surface of the second part opposed from the first part, wherein heat from the laser beam passes through the second part to weld the contacting portions.

8. The method as defined in claim 7, further comprising cooling the exterior surface of the second part while the heat from the laser beam passes through the second part.

9. The method as defined in claim 7, wherein the second part is shaped as an arcuate plate having a constant thickness, the outer surface being smooth, the grooves being defined only in the inner surface of the outer portion.

10. The method as defined in claim 9, wherein the constant thickness of the second part is at most 0.040 inches.

11. The method as defined in claim 1, wherein the first and second parts are separately molded using different materials.

12. A method of manufacturing a shroud segment, the method comprising:
forming a first portion of a platform of the shroud segment in a green state through powder injection molding such that the first portion has a first arcuate surface, the first arcuate surface having a plurality of grooves defined therein;

forming a second portion of the platform in a green state through powder injection molding such that the second portion has a second arcuate surface complementary to the first arcuate surface;

interconnecting the first and second portions in the green state by interconnecting the first and second arcuate surfaces, wherein the grooves in the interconnected arcuate surfaces define a plurality of cooling passages, and wherein at least one of forming the first portion and forming the second portion includes defining at least one fluid passage in fluid communication with the plurality of cooling passages and with an outer surface of the platform; and debinding and sintering the interconnected portions to define the platform including the plurality of cooling passages in fluid communication with the outer surface of the platform.

13. The method as defined in claim 12, wherein the first and second portions are formed so that the first arcuate surface is concave and the second arcuate surface is convex.

14. The method as defined in claim 12, wherein the portions are fused together during the debinding and prior to the sintering.

15. The method as defined in claim 12, wherein the first portion of the platform is formed to include at least one retention element.

16. The method as defined in claim 12, wherein interconnecting the first and second arcuate surfaces is performed by heating contacting portions of the first and second arcuate surfaces using a laser beam directed on an exterior surface of the second portion opposed from the first portion, wherein heat from the laser beam passes through the second part to weld the contacting portions.

17. The method as defined in claim 16, wherein at least some of the contacting portions are defined between adjacent ones of the grooves.

18. The method as defined in claim 16, further comprising cooling the exterior surface of the second portion while the heat from the laser beam passes through the second portion.

19. The method as defined in claim 12, wherein the second portion is formed as an arcuate plate having a constant thickness and with the second arcuate surface having a smooth configuration.

20. The method as defined in claim 12, wherein the first and second portions are separately molded using different materials.

\* \* \* \* \*